(12) United States Patent
Lee et al.

(10) Patent No.: US 7,370,198 B2
(45) Date of Patent: May 6, 2008

(54) TOTAL SYSTEM FOR PREVENTING INFORMATION OUTFLOW FROM INSIDE

(75) Inventors: Jong-Sung Lee, Kyeonggi-do (KR); Seung-Ryeol Choi, Seoul (KR)

(73) Assignees: WaterWall Systems Co., Ltd. (KR); P & IB Co., Ltd. (KR)

( * ) Notice: Subject to any disclaimer, the term of this patent is extended or adjusted under 35 U.S.C. 154(b) by 566 days.

(21) Appl. No.: 10/297,124

(22) PCT Filed: May 21, 2001

(86) PCT No.: PCT/KR01/00834

§ 371 (c)(1),
(2), (4) Date: May 28, 2003

(87) PCT Pub. No.: WO01/93055

PCT Pub. Date: Dec. 6, 2001

(65) Prior Publication Data

US 2003/0187619 A1    Oct. 2, 2003

(30) Foreign Application Priority Data

| Jun. 1, 2000 | (KR) | ................................. 2000/30133 |
| Jul. 3, 2000 | (KR) | ................................. 2000/37749 |
| Apr. 14, 2001 | (KR) | ................................. 2001/20076 |

(51) Int. Cl.
*H04L 9/00* (2006.01)
*H04L 9/32* (2006.01)
*G06F 7/04* (2006.01)
*G06F 17/30* (2006.01)
*G06K 9/00* (2006.01)

(52) U.S. Cl. ...................... 713/165; 713/150; 713/182; 713/187; 726/2; 726/22; 726/26; 726/31

(58) Field of Classification Search ................ 713/165; 726/2, 22, 26
See application file for complete search history.

(56) References Cited

U.S. PATENT DOCUMENTS

| 6,032,259 A | 2/2000 | Nemoto |
| 6,052,728 A | 4/2000 | Fujiyama |

(Continued)

FOREIGN PATENT DOCUMENTS

JP    5-265832    10/1993

*Primary Examiner*—Nasser Moazzami
*Assistant Examiner*—Chinwendu C Okoronkwo
(74) *Attorney, Agent, or Firm*—Tuchman & Park LLC

(57) ABSTRACT

Disclosed is a total system for preventing an online and off-line leakage of information, which includes a security maintenance client having a program storing a file in a storing device and a file security control part which encodes the file content to be stored in the storing device and stores a log information, and security maintenance server which receives the log information and a decoding key and decodes the encoded file. The security maintenance client further includes a communication security control part which has a communication program transmitting a file and encodes the file content to be transmitted to a transmission destination of a network and stores a log information. The security maintenance server further includes an automatic key transmission part which receives a decoding key to be transmitted to the transmission destination according to a file transmission security policy after receiving the log information and the transmission destination.

30 Claims, 12 Drawing Sheets

U.S. PATENT DOCUMENTS

| | | | |
|---|---|---|---|
| 6,154,850 A * | 11/2000 | Idleman et al. | 714/5 |
| 6,185,680 B1 | 2/2001 | Shimbo | |
| 6,622,248 B1 * | 9/2003 | Hirai | 713/193 |
| 6,795,921 B2 * | 9/2004 | Hayashi et al. | 726/33 |
| 2002/0034306 A1 * | 3/2002 | Owada et al. | 380/282 |
| 2002/0118954 A1 * | 8/2002 | Barton et al. | 386/83 |
| 2003/0054879 A1 * | 3/2003 | Schneier et al. | 463/29 |
| 2004/0255134 A1 * | 12/2004 | Miyamoto | 713/193 |
| 2005/0105737 A1 * | 5/2005 | Asano | 380/277 |

* cited by examiner

OFF-LINE FILE TRANSFER LOG DB

| TRANSFERRED FILE | TRANSFER DESCRIPTION |
|---|---|
| STUDY RESULT.TXT | TO SHARE STUDY RESULT.... |

| TRANSFERRED FILE : | STUDY RESULT.TXT |
| --- | --- |
| DECODING KEY : | fderew13yui863hfg |
| STORAGE LOCATION : | C:/ |

| | |
|---|---|
| DESTINATION E-MAIL ADDRESS : | jslee@safa.co.kr |
| ATTACHED FILE : | IMPORTANT.txt |
| TRANSFER CONTENT : | STUDY RESULT |
| TRANSFER PURPOSE : | COOPERATION WITH IT BUSINESS DIVISION |
| RECEIVER INFORMATION : | JONG-SUNG, LEE |

ON-LINE FILE TRANSFER LOG DB

| DESTINATION | FILE | CONTENT | PURPOSE | RECEIVER |
|---|---|---|---|---|
| | | | | |
| | | | | |

FIG. 7

| SECURITY LEVEL | SMTP | Web-Mail |
|---|---|---|
| RELIABLE LEVEL | MAIL TRANSFER | AUTOMATIC KEY TRANSFER / LOG DATA NOT CREATED |
| NON-RELIABLE LEVEL | LOG DATA CREATED / MAIL TRANSFER INTERRUPTED | LOG DATA CREATED / KEY NOT TRANSFERRED |
| COOPERATIVE LEVEL | LOG DATA CREATE / MAIL TRANSFER | AUTOMATIC KEY TRANSFER / LOG DATA CREATED |

FIG. 8A

SECURITY GROUP MANAGEMENT DB FOR COMPUTERS A,B AND C

| COMPUTER | IP | FILE ENCORDING KEY |
|---|---|---|
| A | 123.123.123.2 | 12345678y |
| B | 123.123.123.3 | 2345fgd56 |
| C | 123.123.123.4 | fdgdgdg45 |

FIG. 8b

SECURITY GROUP MANAGEMENT DB FOR COMPUTERS D AND E

| COMPUTER | IP | FILE ENCORDING KEY |
|---|---|---|
| D | 123.123.123.5 | gh523ewra |
| E | 123.123.123.6 | sesef43vvvj |

MRB INFORMATION DB

| COMPUTER ID | MBRPasswd |
|---|---|
| jslee | 128bit |

TOTAL SYSTEM FOR PREVENTING INFORMATION OUTFLOW FROM INSIDE

TECHNICAL FIELD

The present invention relates in general to an integrated information security system for preventing internal information outflow, and more particularly, to an integrated information security system for monitoring and preventing off-line information outflow via an output device or a portable storage device and on-line information outflow via computer communication programs, to thereby prevent important internal information from being flown out.

BACKGROUND ART

Recently, with the wide spread of computers, data which had been manually handled can be processed in digitalized format by computers.

The increase of data processing and computer communications provides benefits to people, however, it may cause information outflow for a malicious purpose.

In most cases, information outflow to a competing organization is done by a person working for the victim organization, rather than by an external source.

Referring to FIG. 1, conventional methods for flowing out information from an organization can be explained as follows.

The data outflow can be classified into a case executed by an output device such as printers or monitors connected to a computer system of an organization or a portable storage device such as diskettes, hard disks, CD-R, Zip drivers or CD-RW, and a case executed by Internet or PSTN through a modem attached to a computer (for instance, data outflow through file uploading to a bulletin or data collections, e-mail, web-mail, FTP, Internet web-hard, and chatting programs, etc.)

Conventional methods for preventing information outflow have problems as follows.

Defensive Measures against Data Outflow through Floppy Disks

Conventional method I: Floppy disks are removed from personal computers of all public users in order to achieve an in-advance prevention against data outflow through floppy disks.

Conventional method II: Floppy disks are prevented from reading when floppy disks are carried out of an organization.

Problem: Method I suffers a problem in that public users may not use floppy disks, and method II suffers a problem in that specific floppy disks should be discriminated from common disks, and the computer used in the other organization may not discriminate if the disk is for an internal use, formatted one, or damaged one. Furthermore, log data for the data outflow through a floppy disk is not created, thus making it impossible to recognize the data related to trial of data outflow through floppy disks.

Defensive Measures against Data Outflow through Hard Disks

Conventional method: Master boot record is encrypted so as to prevent the system from booting by other user.

Problem: There is no countermeasure to prevent data outflow executed by the owner of the hard.

Defensive Measures against Data Outflow through Zip-disk, CD-R or the like

Conventional method: A storage medium such as Zip-disk or CD-R is an auxiliary storage device which is gaining in popularity over recent few years, and has a high efficiency. To achieve an in-advance prevention against internal data outflow, Zip-disk drives and CD-R drives should be removed or eliminated from personal computers of all public users, and all communication interfaces (like USB, serial port, parallel port and wireless port) which are employed for a connection between MP3 player and a personal computer, should be removed so as to prevent data outflow through a digital audio player like MP3 player.

Problem: Public users may not use a portable storage medium.

Defensive Measures against Data Outflow through Print Outputs or Monitor Outputs Conventional method: The content being printed out is monitored through an administration server. This method is described in detail in Korean Patent Application No. 2000-30133entitled "System and method for monitoring and preventing data outflow through output device" which the applicant of the present invention has filed to the Korean Industrial Property Office.

Defensive Measures Against Data Outflow through Internet or PSTN

I. Data outflow through e-mail

Attach important file copy the important portion of file and paste the same to a mail text open important file and input the content of the file to a mail text Conventional method: Content of the mail text and the attached file is checked so as to determine whether to transmit the mail.

Problem: When the attached file is encrypted or compressed, content search is impossible. There exists therefore a restriction of searching the content of the e-mail or the attached file.

II. Data outflow through data upload through HTTP (including web mail)

Conventional method: Data outflow through web sites is performed through "post" which is an internal command for HTTP, the command "post" itself can be made unavailable by controlling, through a firewall, commands available in HTTP.

Problem: Since this method prevents file transmission for all cases, work efficiency may be deteriorated due to the trouble of sending a file even if the file is an ordinary one.

III. Data outflow through FTP

Conventional method: This method is performed by using the file transmission command "put", and the command "put" itself can be made unavailable by controlling, through a firewall, commands available in HTTP.

Problem: Since this method prevents file transmission for all cases, work efficiency may be deteriorated due to the trouble of sending a file even if the file is an ordinary one.

IV. Data outflow through data upload through TELNET or RLOGIN(Z-modem, KERMIT or the like)

Conventional method: Data upload is the most common method of data outflow through TELNET, and protocols like Z-modem or KERMIT are used in this method. A firewall serves to restrict data download and upload through the use of protocols such as Z-modem or KERMIT over TELNET.

Problem: There exist other methods than data uploading or downloading over TELNET. Therefore, if the data is transmitted as encoded format rather than as a plain text format, it is impossible to search data even through a key-word search. This means that there exists explicit limitations for preventing data outflow over the use of TELNET.

V. Data outflow through PSTN

Conventional method: It is extremely difficult to check data outflow through a modem, and the only method for preventing data outflow through a modem is to remove modems from personal computers.

VI. Data outflow through web hard

VII. Data outflow through network file system

Besides the above-mentioned communication protocols, there exist other protocols available through Internet, which increases the possibility of internal data outflow. The above-mentioned methods are most common and suffer a variety of drawbacks, and such conventional methods can be summarized to a sentence "The best approach of preventing internal data outflow through network is to make the network itself unavailable". However, this sentence is meaningless since modern society cannot go even a day without using Internet and computer communications.

DISCLOSURE OF INVENTION

Therefore, it is an object of the present invention to provide an integrated information security system for preventing internal information outflow, in which the information security system monitors and prevents an off-line information outflow through an output device and a portable storage device and an on-line information outflow through communication programs so as to thereby obtain an in-advance prevention against information outflow from organization.

To accomplish the above object of the present invention, there is provided an integrated information security system for preventing internal information outflow, the system including a program for storing a file into a storage device; a security administration client having a file security control unit for encoding file content, storing the encoded file into the storage device, and storing log data for file storage; and a security administration server for receiving, through communications with the file security control unit, log data and decoding keys for the encoded file and decoding the encoded file.

Preferably, the storage device is at least one of a remote storage device and a portable storage device connected to a network.

Preferably, the security administration client further includes a communication program for transferring files, and a communication security control unit for encoding the file content, transferring the encoded file to a destination of the network and storing log data for file transfer. The security administration server includes an automatic key transfer unit for receiving decoding keys for the encoded file through communication with the communication security control unit, receiving the log data and the destination data, and transferring decoding keys to the destination in accordance with a file transfer security policy for the destination.

Preferably, the communication security control unit receives from user input the file content and transfer description upon occurrence of file transfer through the communication program.

Preferably, the file transfer security policy defines security level for the destination, automatically transfers only decoding keys to the destination if the security level is a "reliable" level, transfers decoding keys to the destination and at the same time stores the log data if the security level is a "cooperative" level, and stores and manages only the log data if the security level is a "non-reliable" level.

Preferably, the encoded file being transferred is formed of a file format coupled with codes for decoding the encoded file.

Preferably, the communication security control unit controls whether to transfer the file to a network in accordance with the destination based on the file transfer security policy.

Preferably, the file transfer security policy allows the file to be transferred to the destination if the destination is a "reliable" level, allows the file to be transferred to the destination and at the same time allows the log data to be stored if the destination is a "cooperative" level, and allows file transfer to be interrupted and stores and manages only the log data if the destination is a "non-reliable" level.

Preferably, the communication security control unit allows communication to be interrupted if a source address does not exist within a preset security group upon occurrence of communication request from the network to the security administration client, and allows communication to be interrupted if a destination address does not exist within the preset security group upon occurrence of communication request from the security administration client to the network.

Preferably, the preset security group is set into an IP address group by the security administration server.

Preferably, the communication security control unit makes a computer clip board for executing the communication program clear and other program inactive when the communication program is activated.

Preferably, the communication security control unit stores an information input through a keyboard of the computer executing the communication program and transfers the stored information to the security administration server for storage and management of the information.

Preferably, the security administration client further includes an application program for creating print data and executing print work, and a print control unit for intercepting the print data and transferring the print data to the security administration server, and the security administration server receives and outputs the print data while communicating with the print control unit.

Preferably, the security administration client further includes a hardware control unit for transferring the content output onto a monitor to the security administration server in accordance with the request from the security administration server.

Preferably, the hardware control unit enables/disables an input device function of the security administration client in accordance with the request from the security administration server.

Preferably, the file security control unit transfers programs installed in the security administration client and hardware information to the security administration server.

Preferably, the file security control unit prevents the installed program from opening, in accordance with a request from the security administration server, so as to prevent the program from starting.

Preferably, the security administration server manages a list of program available to the security administration client, and prevents programs which are not included in the available program list from among the installed programs from starting.

Preferably, the computer storage device has a master boot record(MBR) which is encoded, and the encoding key value is constituted by characteristic hardware serial number of the computer, so as to control access to a computer having the security administration client installed therein.

Preferably, the hardware serial number is stored and managed by the security administration server.

Preferably, the file security control unit decodes, through the use of the decoding key, the encoded file stored in the storage device, stores the decoded file to the storage device, and transfers the content of the file to the security administration server together with the transfer description.

Preferably, the file security control unit decodes, through the use of the decoding key, the encoded file stored in the storage device in accordance with the read request from the security administration client program, and transfers the result to the security administration client program.

Preferably, the security administration server allows the decoding key value to be shared with each file security control unit of security administration clients existing within the preset security group, and thus allows the encoded file stored in the storage device to be decoded and read within the security group.

Preferably, the security administration client is installed in a plurality of user computers, and receives authorization from the security administration server when uninstalled from the user computer.

Preferably, the file security control unit controls whether to operate the storage device in accordance with the request from the security administration server.

Preferably, the file security control unit receives transfer description and transfers the file description to the security administration server in case of storing the file in the storage device through the program.

Preferably, the security administration client further includes a temporary log data storage unit for storing the log data upon occurrence of interruption of communications with the security administration server, and transfers the stored log data to the security administration server when communication with the security administration server is recovered.

BRIEF DESCRIPTION OF THE DRAWINGS

The present invention as well as a preferred mode of use, further objects and advantages thereof will be best understood by reference to the following detailed description of an illustrative embodiment when read in conjunction with the accompanying drawings, wherein:

FIG. 6a illustrates an on-line transfer description input window for inputting transfer description when a file is transferred over a network through a communication security control unit according to the present invention;

FIG. 6b illustrates an example where the content input to the on-line transfer description input window is stored in an on-line file transfer log database of a security administration server;

FIG. 7 illustrates a file transfer security policy for security level of destination for each type of communication program according to the present invention;

FIG. 8a illustrates configuration of security group management database for user computers A, B and C;

FIG. 8b illustrates configuration of security group management database for user computers D and E;

BEST MODE FOR CARRYING OUT THE INVENTION

With reference now to the figures, an integrated information security system for preventing internal information outflow will be explained in more detail.

Terms used throughout the specification are defined considering functions of elements in the present invention. Therefore, it should be readily understood that the terms of the present invention are not limited to the specific type of elements described herein and can be varied according to the intention of those skilled in the art or usual practice.

Specifically, in an embodiment of the present invention, since an encoding system employed for encoding a transfer file is a symmetric encoding system, encoding keys and decoding keys have same values. Therefore, encoding keys and decoding keys or file encoding keys and file decoding keys can be used as mixed since the file encoded by encoding keys can be decoded by decoding keys(i.e., encoding keys).

Figure 1:
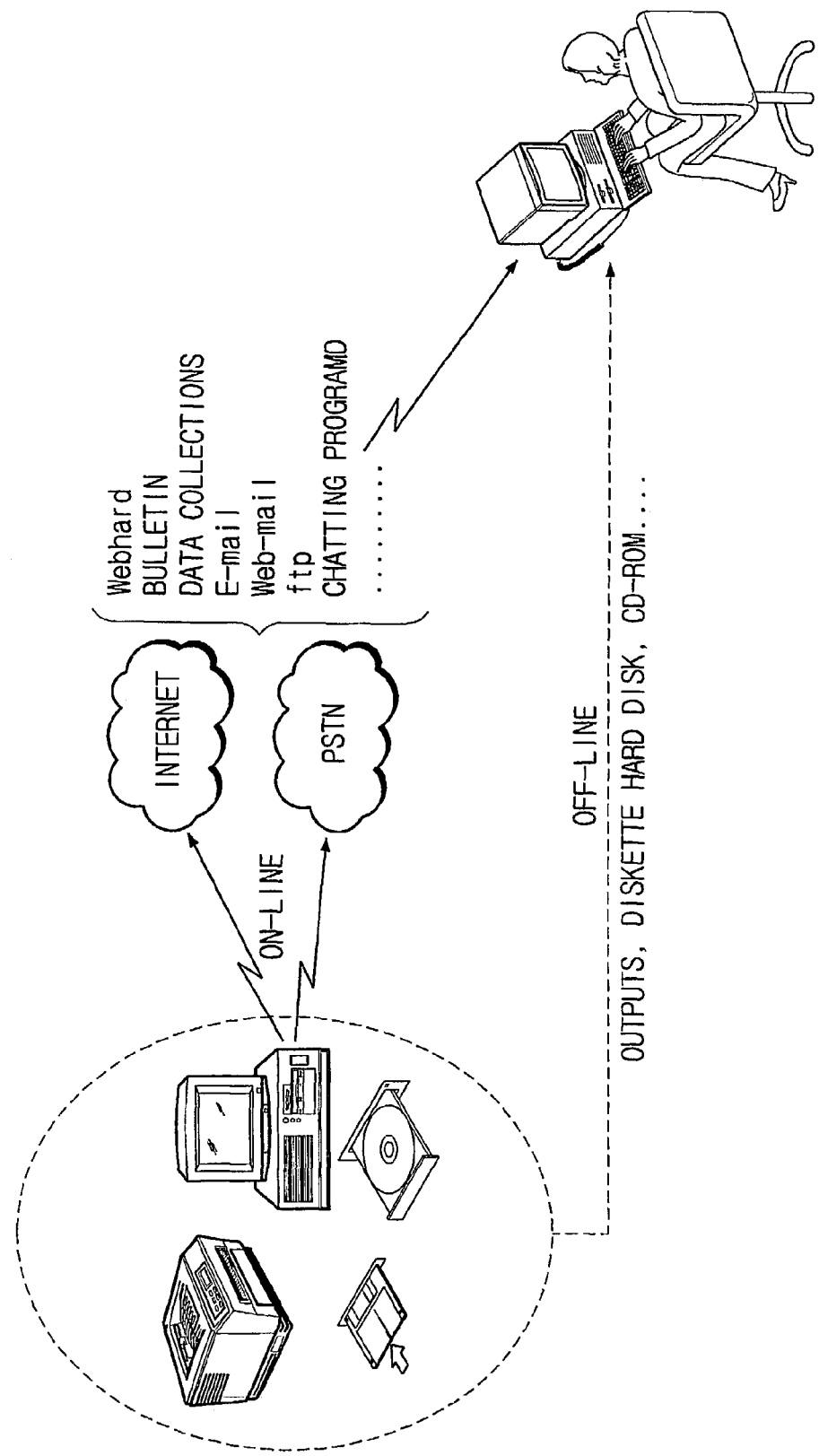
FIG. 1 illustrates types of information outflow possibly carried out by a person working for the victim organization.
Figure 2:
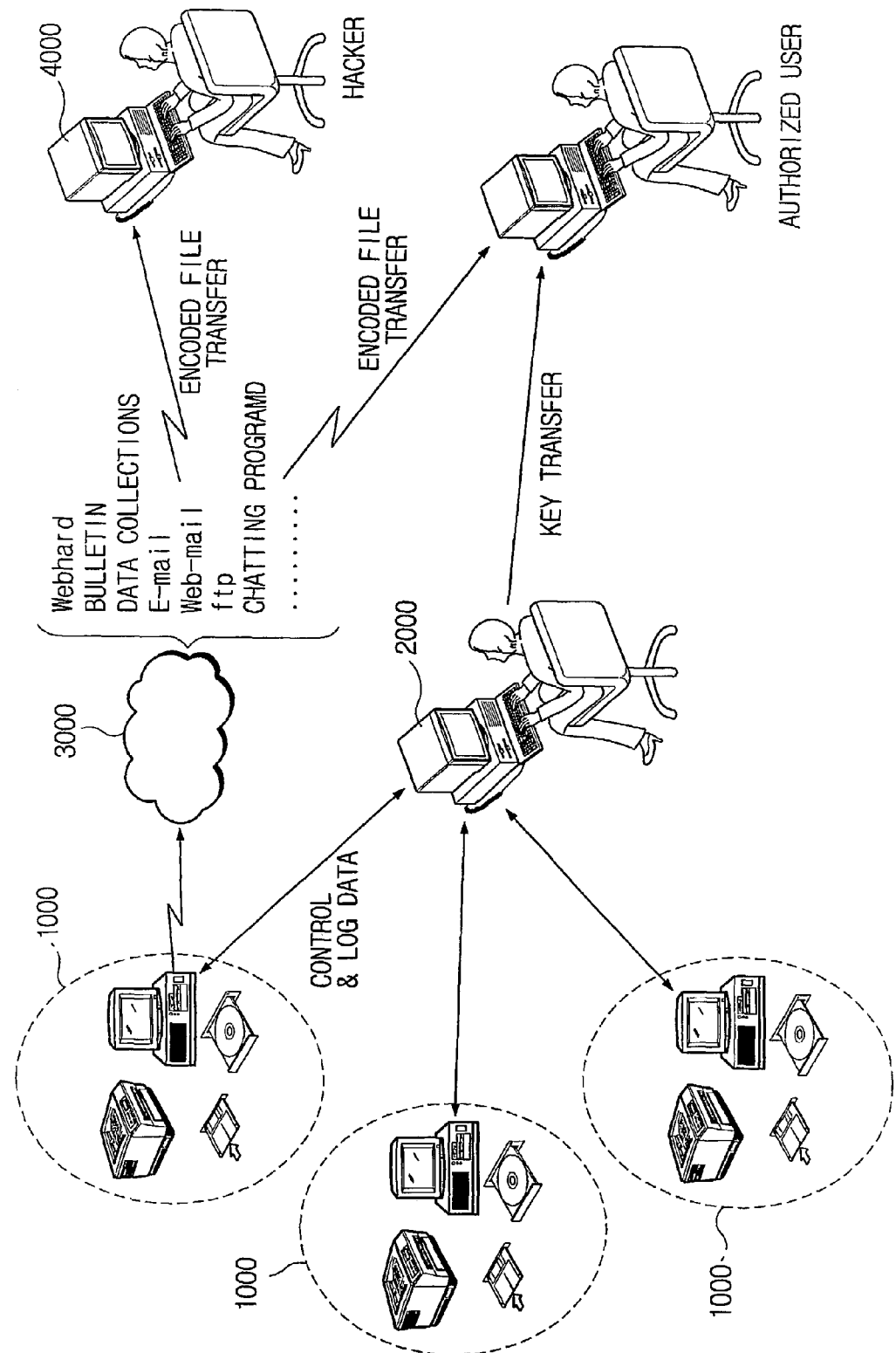
FIG. 2 illustrates an integrated security service for a variety of user computers through an information security system for monitoring and preventing information outflow according to the present invention.
Figure 3:
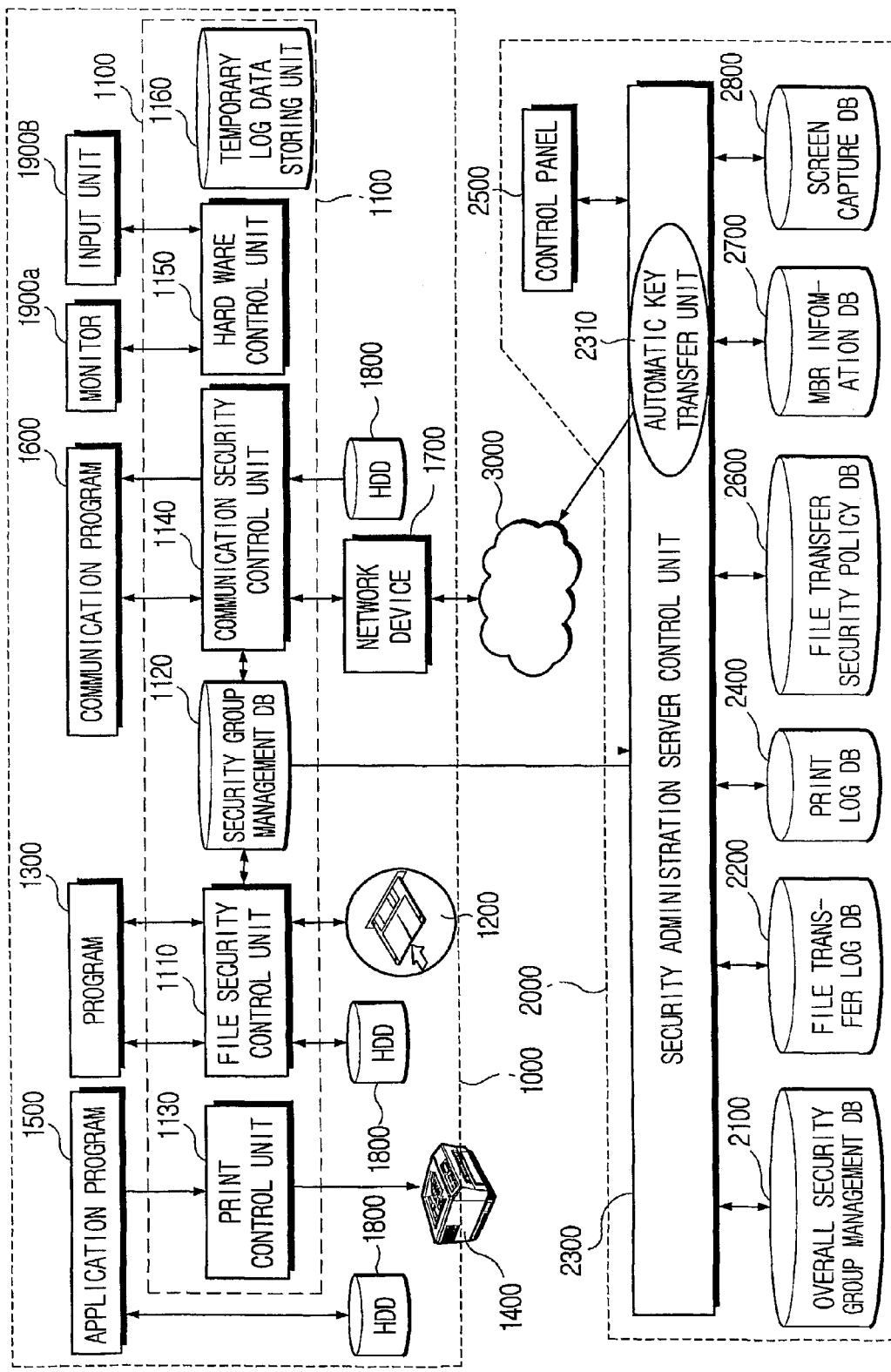
FIG. 3 illustrates an integrated information security system for preventing internal information outflow according to the present invention.

Referring to FIGS. 2 and 3, a security administration client 1100 of a user computer 1000 automatically encodes a file through a file security control unit 1110 using preset encoding keys and stores the encoded file into a portable storage device 1200 so as to prevent an off-line information outflow through the portable storage device 1200, when the file is stored through a program 1300 in the portable storage device 1200 such as floppy disks, Zip-disks, flesh memory, MP-3 players, small digital storage device, and the like.

Subsequently, log data(including file name, user and time information) and encoding key information are transferred to a security administration server 2000, and stored in an overall security group management database 2100 and a file transfer log database 2200, respectively.

Preferably, the encoding key is created upon installation of the security administration client 1100 to the user computer 1000, and stored in a security group management database 1120 of the security administration client 1100. The security group management database 1120 stores and manages encoding keys of user computers existing within the same security group, and the overall security group management database 2100 of the security administration server 2000 stores and manages encoding keys of user computer existing within all security groups.

An automatic encoding of file can be explained in more detail, as follows. Upon occurrence of file storage event, encoding keys of the user computer 1000 are searched from the security group management database 1120 and input to the file security control unit 1110. Subsequently, the file security control unit 1110 takes as an input the content of the file to be stored, encodes the received file content by using encoding keys of the user computer 1000, and stores the encoded file in the portable storage device 1200.

The file security control unit 1110 controls whether or not to operate the portable storage device 1200 in accordance with the request from the security administration server 2000, and receives transfer description from a user and transmits the same to the security administration server 2000 upon storing of file into the portable storage device 1200 through the program 1300. For instance, upon transfer of file through a CD-recorder, the security administration server 2000 permits use of CD-recorder after receipt of transfer description for the file transfer through the use of CD-recorder.

Meanwhile, the file security control unit 1110 receives the decoding key(same as the encoding key) of the user computer 1000 from the security group administration database 1120, decodes the encoded file by using the decoding key and transfers the decoded file to the program 1300, in accordance with the read request made from the program 1300 with respect to the encoded file stored in the portable storage device.

Thus, the program 1300 reads and executes the encoded file stored in the portable storage device 1200, and stores into the portable storage device 1200 the file which is automatically encoded after completion of execution.

The security administration server 2000 may constitute a security group in accordance with the control of the security administrator, and read without restriction the file encoded and stored in a portable storage device within a security group since encoding keys for each user computer 1000 are shared within the same security group. Such an embodiment will be described in detail with reference to FIG. 8.

To legally take an encoded file out of the portable storage device 1200, a user receives decoding keys(same as encoding keys) from the security group management database 1120 of the user computer 1000 by the file security control unit 1110, decodes the encoded file by using decoding keys, and stores the decoded file into the portable storage device 1200. Here, the user inputs transfer description via the off-line transfer description input window shown in FIG. 4*a*, and the input content is stored in the off-line file transfer log database of the security administration server 2000 as shown in FIG. 4*b*.

Figures 4A, 4B:
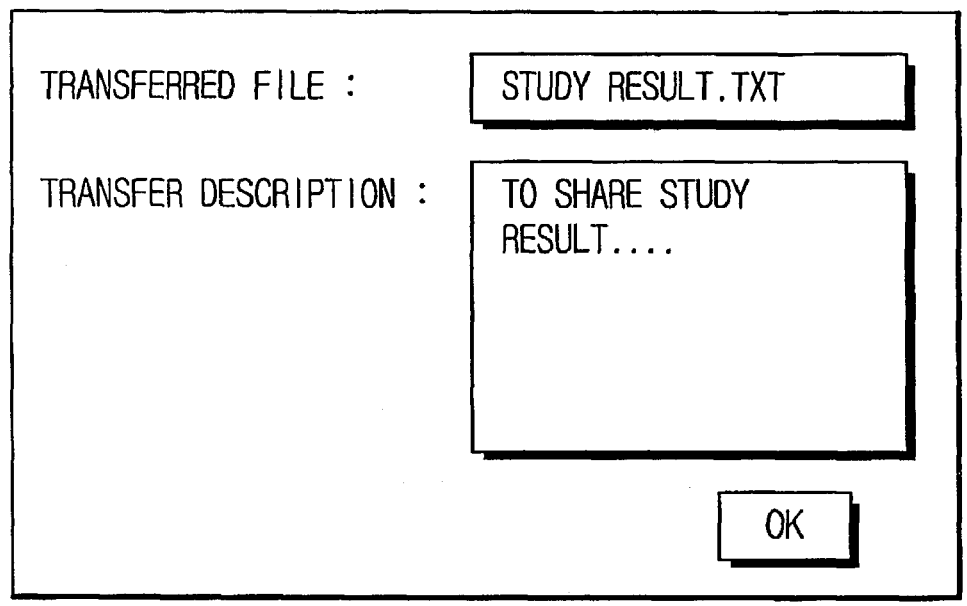
FIG. 4a illustrates an off-line transfer description input window for inputting transfer description when file is transferred to a portable storage device through a file security control unit according to the present invention.
FIG. 4b illustrates an example where the content input to the off-line transfer description input window is stored in an off-line file transfer log database of a security administration server.

As shown in FIGS. 4*a* and 4*b*, the name of the file to be transferred is "study result.txt", and the transfer description (purpose) is "to shard the study result".

As another embodiment of the present invention, the security administration server control unit 2300 decodes the encoded file recorded in the portable storage device 1200 by using decoding keys received from the system which encodes the file stored in the overall security group management database 2100.

In addition, the security administrator recognizes, through log data for file outflow, the number of trials of information outflow tried via the portable storage device 1200. Preferably, the same is true to the storage device(not shown) connected to a network.

To prevent information outflow through the use of output device such as a printer 1400, a print control unit 1130 of the user computer 1000 intercepts the print data created by an application program 1500 and transmits the print data to the security administration server 2000. Then, the print data is stored in a print log database 2400 of the security administration server 2000, and output in accordance with the request from the security administrator made through a control panel 2500.

To prevent information outflow through the use of a communication program 1600, the security administration client 1100 of the user computer 1000 allows the file to be automatically encoded by the communication security control unit 1140, transfers the encoded file to the destination via a network device 1700 such as a modem, LAN cards and the like, and transfers the relevant log data such as destination, file name, user and time information, and an encoding key information to the security administration server 2000 for storage, when the file is transferred to a network 3000 such as Internet, PSTN, radio network and the like.

The process of automatically encoding file and transmitting the encoded file can be described in detail, as follows. Upon occurrence of file opening from a hard disk 1800, the communication security control unit 1140 encodes, by using the session encoding key created from a session key generation unit(not shown), the content of file to be opened, and transmits the encoded file to a receiver through the network 300. The communication security control unit 1140 transfers the encoded file with a decoding program code attached thereto as shown in FIG. 5*a*, and allows the receiver to receive decoding keys and decode the encoded file by using decoding keys as shown in FIG. 5*b*.

Preferably, a communication program 1600 is a web mail program using a web browser.

Figures 5A, 5B:
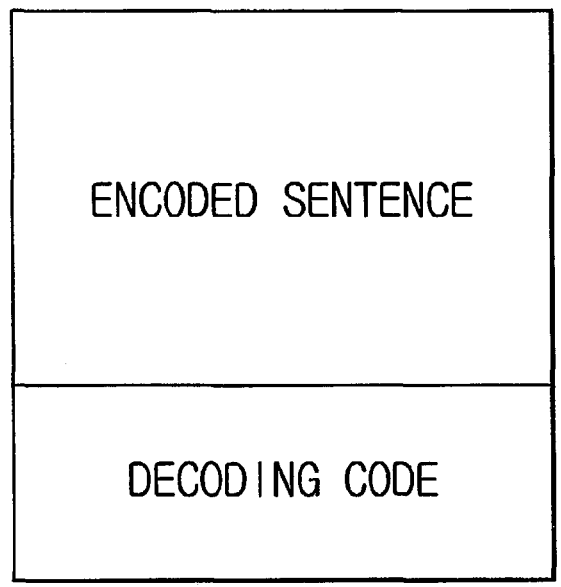
FIG. 5a illustrates the format(SDFA) of a on-line transfer file being transferred through a communication program according to the present invention.
FIG. 5b illustrates a screen of an on-line file transfer executed by a receiver.

The transferred encoded file(i.e., formatted file as shown in FIG. 5*a*) has content understandable only through the decoding key received from the security administration client 1100. Therefore, a hacker 4000 who is not provided with decoding keys from the security administration server 2000 cannot see the file content. Thus, information outflow can be prevented.

Upon occurrence of file transfer event through the communication program 1600, the communication control unit 1140 receives from a user input the file content, transfer description and receiver information through the on-line transfer description input window shown in FIG. 6*a*, and stores the received information into an on-line file transfer log database of the file transfer log database 2200 of the security administration server 2000 as shown in FIG. 6*b*.

Preferably, an automatic key transfer unit 2310 of the security administration server 2000 receives log data with respect to the encoded file transfer, destination and receiver information from the security administration client 1100 of the user computer 1000, and automatically transfers decoding keys for the encoded file in accordance with the file transfer security policy preset in the file transfer security policy database 2600.

The security administrator establishes file transfer security policy by defining security level for the destination and the receiver.

FIG. 7 illustrates file transfer security policy for the case of using SMTP mail and web mail.

Preferably, the automatic key 7 transfer unit 2310 transfers only the decoding key to the destination if the security level is a "reliable" level, transfers the decoding key and at the same time stores log data into the file transfer log database 2200 if the security level is a "cooperative" level, and stores and manages only log data into the file transfer log database 2200 if the security level is a "non-reliable" level, as shown in FIG. 7.

According to another embodiment of the present invention, in case where the communication program 1600 is a mail agent program which uses SMTP protocol, the communication security control unit 1140 of the security administration client 1100 controls whether or not to transfer file in accordance with a file transfer security policy, when the file is transferred to the network 3000 through the communication program 1600.

The file transfer security policy permits the file to be transferred to the destination if the security level of the destination is a "reliable" level, permits the file to be transferred to the destination and at the same time stored in the security administration server 2000 if the security level of the destination is a "cooperative" level, and interrupts file transfer, stores only the log data into the security administration server 2000 and manages the stored log data if the security level of the destination is a "non-reliable" level, as shown in FIG. 7.

The communication security control unit 1140 interrupts communication if the source IP address does not exist within the security group preset in the security group management database 1120 when communication request is made from the network 3000 to the security administration client 1100, and interrupts communication if the destination IP address does not exist within the security group preset in the security group management database 1120 when communication request is made from the security administration client 1100 to the network 3000.

Since technique for interrupting a specific communication is well known to the person skilled to the art, detailed description thereof will be omitted.

The security group management database 1120 of the security administration client 1100 is set by an administrator through the control panel 2500 of the security administration server 2000, and constituted by an IP address list within the same security group and a file encoding key list.

The process of sharing encoding file stored in a portable storage device within the same security group and controlling access to each other through a network is described with reference to FIG. 8, as follows.

Figure 8C:
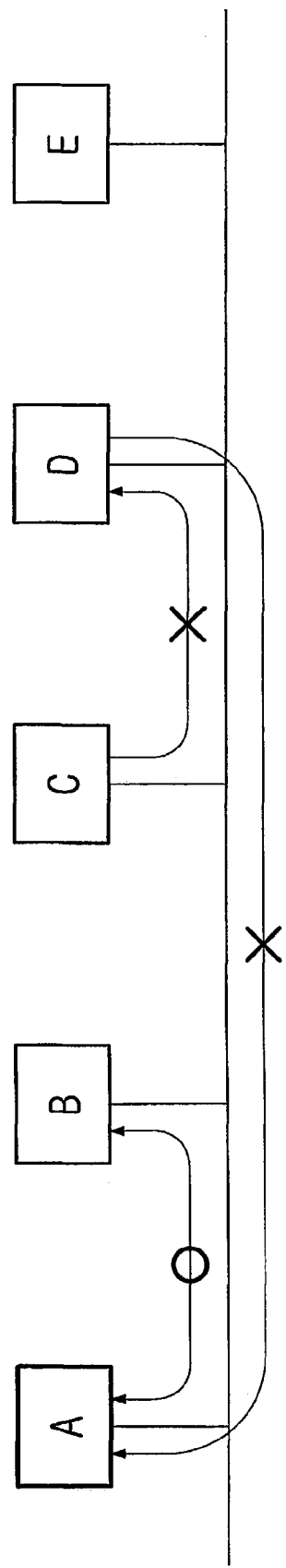
FIG. 8c illustrates a concept of access control in the event of sharing portable storage device and network within the same security group according to the present invention.

First, the security group database 1120 of the user computer (A) is as shown in FIG. 8a. In case where a file is transferred from the user computer (A) to the portable storage device 1200, user computer (B or C) has the security group management database 1120 as shown in FIG. 8a. Therefore, it is possible to read the file through each file security control unit 1110 by using the file encoding key(i.e., "12345678y") of the user computer (A) stored in the database. However, user computer (D or E) has the security group management database 1120 as shown in FIG. 8b, it is impossible to read the file encoded in the user computer(A).

In the meantime, user computer (A) is capable of making access to the user computer (B), however, it is incapable of making access to the user computer (D) which does not belong to the same security group. In addition, the user computer (A) allows for the access from the user computer (B or C), however, does not allow for the access from the user computer (D or E) which does not belong to the same security group. Such a restriction for access is performed by each communication security control unit 1140, with reference to the security group management database 1120 of each user computer 1000.

Preferably, when the communication program 1600 is activated in the user computer 1000, that is, when the communication program window is maximized, the communication security control unit 1140 makes the clip board (not shown) of the user computer 1000 executing a communication program clear and inactivates all other programs currently in the activated state(i.e., minimizes all program windows).

Thus, important file content can be prevented from being opened, copied and pasted to the communication program text after starting of the communication program.

The communication security control unit 1140 stores information which is input through a keyboard and transfers the same to the security administration server 2000 when a communication program is activated in the user computer 1000.

According to the request from the security administration server 2000, the hardware control unit 1150 of the security administration client 1100 transfers the content output to a monitor 1900a so as to allow the content to be output in real time onto the control panel 2500. Alternately, the hardware control unit 1150 transfers to the security administration server 2000, the data which is created by periodically screen-capturing the output content of a monitor 1900a, so as to allow the captured data to be stored in a screen capture database 2000. The hardware control unit 1150 enables/disables function of an input device 1900b in accordance with the request from the security administration server 2000.

The security administration client 1100 transfers the program installed in the user computer 1000 and the hardware information of the computer to the security administration server 2000 in response to the request from the security administration server 2000. The security administration client 1100 is constituted by a registry(not shown) information, program registration information and system manager information searched from the user computer 1000.

The security administration client 1100 can prevent a specific program from starting in accordance with the request from the security administration server 2000, and the security administration server 2000 manages available authorized software list, and disables the program which is not included in the list, from among the computer programs transferred through the security administration client 1100. By this method, use of an unauthorized software throughout an organization can be prevented.

The security administration client 1100 needs authorization from the security administration server 2000 when installed in or uninstalled from the user computer 1000. For example, whether a security administrator has an authority is checked, through a connection to the security administration server 2000, during execution of uninstall routine, and only the authorized administrator can permit uninstallation.

When communication with the security administration server 2000 is interrupted, the security administration client 1100 stores, into a temporary log data storing unit 1160, the log data(such as file transfer information or network use state) to be transferred to the security administration server 2000, and transfers the log data stored in the temporary log data storing unit 1160 to the security administration server 2000 when the communication with the security administration server 2000 restarts. Thus, the information security service same as those described above can be supplied even when communication interruption has occurred due to a user's intention or a network trouble.

Preferably, master boot recorder of the user computer 1000 is encoded, and only the system of the corresponding user computer is normally booted. Here, the key value is constituted by a hardware serial number(for example, communication card serial number(MCA) or processor(CPU) serial number) unique to the user computer.

Meanwhile, the security administration server 2000 manages unique hardware serial number so as to boot the hard disk of the user computer 1000. Therefore, the unique hardware serial number is utilized when the hard disk is legally installed to other computer.

Thus, the hard disk may not be read when the hard disk is flown out by a computer user or other person, preventing information outflow through the hard disk.

Figure 9:
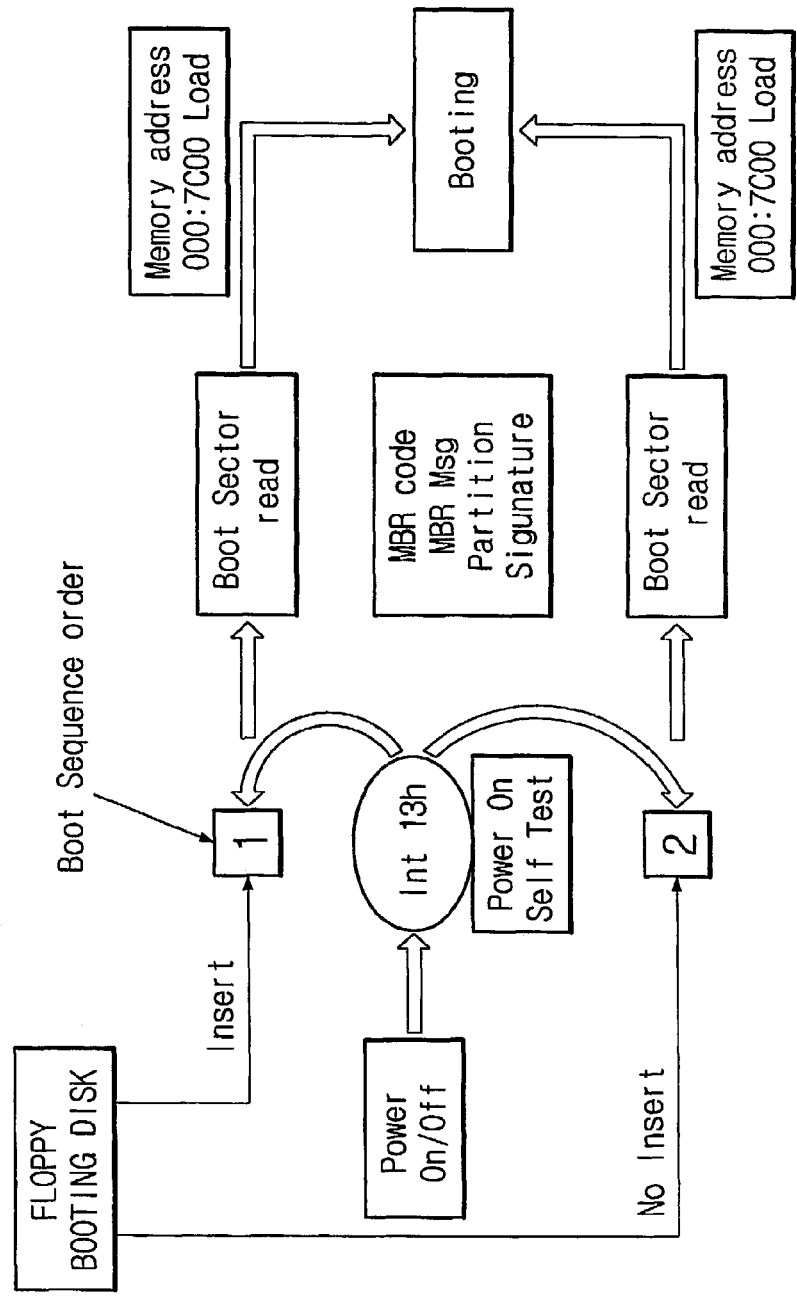
FIG. 9 illustrates a booting sequence for a conventional computer system.

A conventional booting procedure and access control for a computer system can be explained with reference to FIG. 9.

First, booting method can be divided into a method through a floppy booting disk and a method through a hard disk. When the power of computer system is turned on, the system self-checks its state, which is called a "power-on self-test". When the floppy disk is inserted into the drive, the system first reads the booting sector of the floppy booting disk and then the hard disk partition information, and loads to the memory address 0000:7C00 so as to proceed with the system booting. If the floppy disk is not inserted, the system reads the booting sector of the hard disk so as to perform MBR code, and then the hard disk partition information, and loads to the memory address 0000:7C00. System access can be controlled by granting access to the partition information only when an authorization code for the system access control is input to the MBR code and a correct password is input.

Figures 10A, 10B:
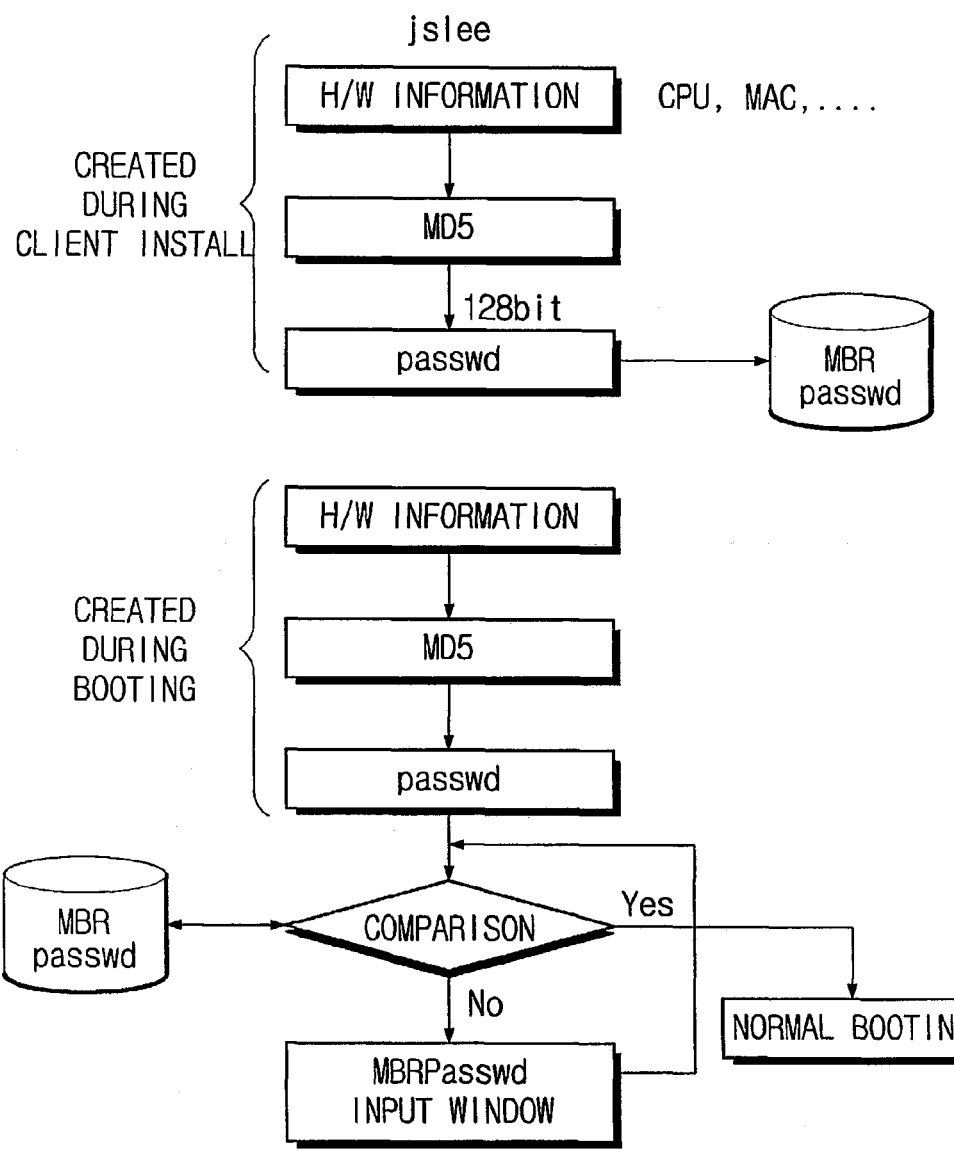
FIG. 10a illustrates a system access procedure through a master boot record (MRB) encryption according to the present invention.
FIG. 10b illustrates an MRB database for the security administration server for storing and managing MRB password for encryption of master boot record.

A process of obtaining grant for system access through encoding process for a master boot record(MBR) can be explained with reference to FIG. 10. The result obtained by extracting system hardware information and encoding by MD5 is stored into the user computer 1000 and an MBR database 2700 of the security administration server 2000, respectively, as shown in FIG. 10b, when the security administration client 1100 is installed in the user computer 1000.

When a booting is tried after completion of installation of the security administration client 1100, the booting procedure proceeds normally if the password obtained by processing the hardware information through the use of MD5 and the pre-created password match with each other. If both passwords do not match, 128-bit character string is input through an MBR password input window so as to check the passwords. That is, when the hard disk having the security administration client 1100 installed therein, is installed and used normally in other computer, MBR password for the user computer installed with the hard disk is obtained from the MBR database 2700 and input to the MBR password input window.

Figure 11:
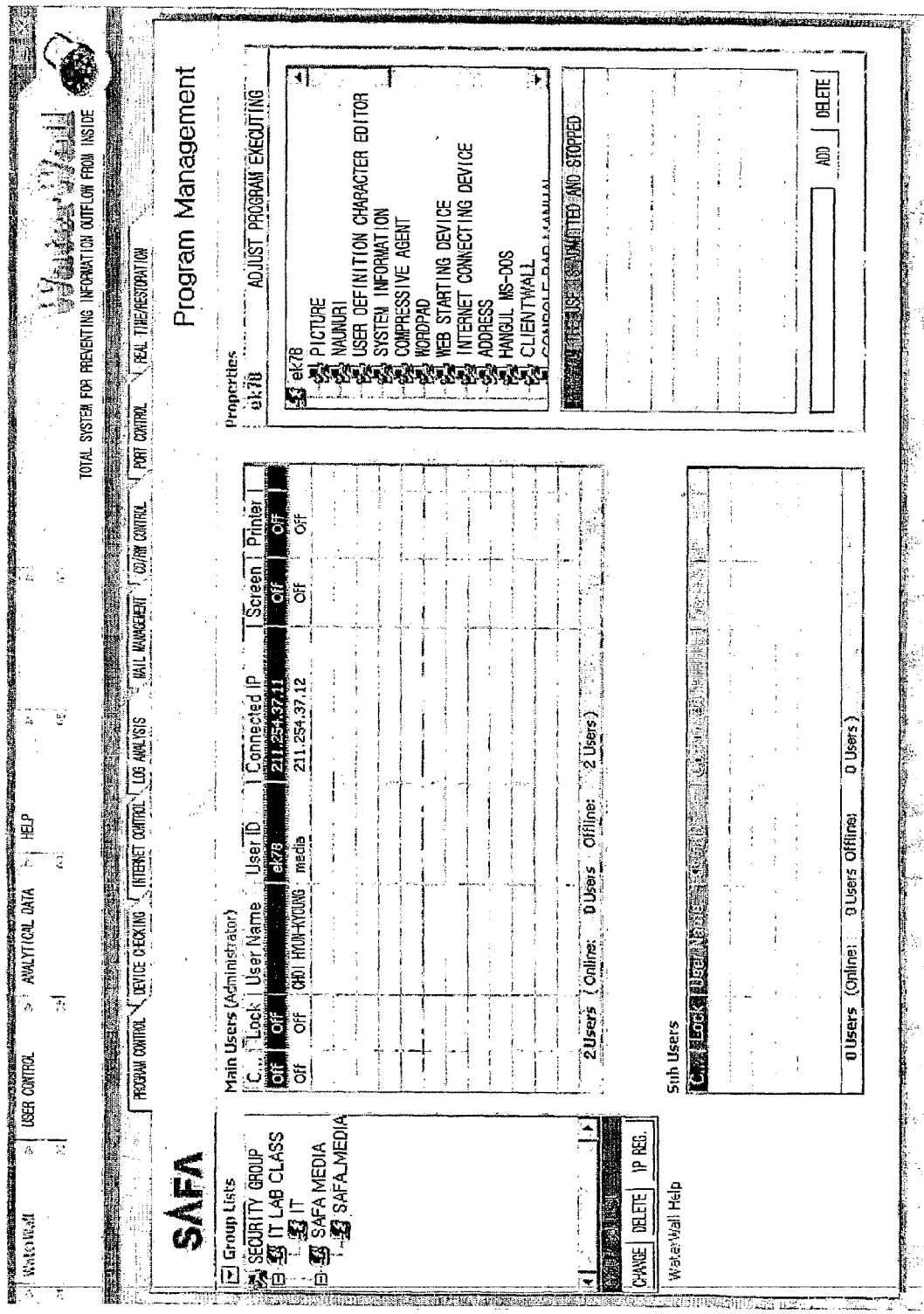
FIG. 11 illustrates an embodiment of a control board for the security administration server according to the present invention.

To perform all functions of the present invention described above, the security administrator controls all security administration clients 1100 via the control panel 2500 of the security administration server 2000 as shown in FIG. 11.

INDUSTRIAL APPLICABILITY

As described above, an integrated information security system for preventing internal information outflow of the present invention is advantageous in that the system monitors and prevents off-line information outflow via an output device or a portable storage device and on-line information outflow via computer communication programs, to thereby prevent important internal information from being flown out.

Many modifications and variations of the present invention are possible in the light of the above techniques, it is therefore to be understood that within the scope of the appended claims, the prevent invention may be practiced otherwise than as specifically described.

By way of example, the integrated information security system of the present invention can be applied to all types of files transferable through a connection between a storage device and the communication and output interface installed in the user computer, such as a serial port, parallel port, USB port, IEEE1394 port or radio port.

In the above-described embodiment, database of the security administration server is managed by user computer units. However, it is also possible to manage the database by user units.

What is claimed is:

1. A total system for preventing information outflow from inside, comprising:
    a program installed on at least one user computer for storing a file to a storage device connected to the at least one user computer;
    a security administration client including a file security control unit for encoding content of the file when storing the encoded file into said storage device according to a request from said program, and providing a decoding key for the encoding file; and
    a security administration server for receiving, through communications with said file security control unit, the decoding key for said encoded file and storing the decoding key in a database of the server;
    wherein, when said program requests the encoded file stored in the storage device, the file security control unit decodes the encoded file using the decoding key and transfers the decoded file to said program; and
    wherein the file security control unit receives a human-readable transfer description, the transfer description describing the purpose of the transfer to said storage device, and transmits the transfer description to the security administration server for database storage.

2. A total system for preventing information outflow according to claim 1, wherein said storage device is at least one of a remote storage device connected to a network and a portable storage device connected to the network.

3. A total system for preventing information outflow from inside, comprising:
    a communication program executing on at least one user computer for transferring a file into a network connected to the at least one user computer;
    a security administration client including a communication security control unit for encoding content of the file, transferring the encoded file to a transfer destination of said network and storing log information about the file transfer, the log information including a human-readable transfer description describing the purpose of the transfer to the transfer destination; and
    a security administration server for receiving a decoding key for said encoded file, the log information, and the transfer destination through communications with said communication security control unit and transferring the decoding key to said transfer destination in accordance with a file transfer security policy for said transfer destination, wherein the transferred encoded file includes a file format and a code for decoding the encoded file upon receipt of the decoding key.

4. A total system for preventing information outflow according to claim 3, wherein said communication security control unit receives the content of the file.

5. A total system for preventing information outflow according to claim 3, wherein the security administration server defines a security level for said transfer destination according to the file transfer security policy, automatically transfers only the decoding key to said transfer destination when the security level is a "reliable" level, transfers the decoding key to said transfer destination and simultaneously stores said log information when the security level is a "cooperative" level, and stores and manages only said log information when the security level is a "non-reliable" level.

6. A total system for preventing information outflow according to claim 3, wherein said communication security control unit controls whether to transfer said file to said transfer destination based on said file transfer security policy when transferring the file into the network.

7. A total system for preventing information outflow according to claim 6, wherein the communication security control unit transfers said file to said transfer destination when a security level is a "reliable" level, transfers said file to said transfer destination and simultaneously stores said log information when the security level is a "cooperative" level, and stores and manages the log information and simultaneously prevents the file from being transferred when the security level is a "non-reliable" level.

8. A total system for preventing information outflow according to claim 3, wherein said communication security control unit interrupts communication when a communication source address does not exist within a preset security group upon occurrence of a communication request from said network to said security administration client, and interrupts communication when a communication destination address does not exist within a preset security group upon occurrence of a communication request from said security administration client to said network.

9. A total system for preventing information outflow according to claim 8, wherein said preset security group is an IP address group accessible by said security administration server.

10. A total system for preventing information outflow according to claim 3, wherein said communication security control unit clears a computer clip board of the at least one user computer executing said communication program and deactivates other programs when said communication program is activate.

11. A total system for preventing information outflow according to claim 3, wherein said communication security control unit stores a keyboard input of the at least one user computer executing said communication program, and transfers and stores the keyboard input to said security administration server when the communication program is active.

12. A total system for preventing information outflow according to claim 1, wherein said security administration client further comprises an application program for creating print data to execute a print work and a print control unit for intercepting said print data and transferring said print data to said security administration server, wherein said security administration server receives and outputs said print data through communications with said print control unit.

13. A total system for preventing information outflow according to claim 1, wherein said security administration client further comprises a hardware control unit for transferring content outputted to a monitor to the security administration server in accordance with a request from said security administration server.

14. A total system for preventing information outflow according to claim 13, wherein said hardware control unit enables and disables an input device of said security administration client in accordance with a request from said security administration server.

15. A total system for preventing information outflow according to claim 1, wherein said file security control unit transfers program and hardware information installed in said security administration client to said security administration server.

16. A total system for preventing information outflow according to claim 15, wherein said file security control unit prevents said installed program from opening in accordance with a request from said security administration server.

17. A total system for preventing information outflow according to claim 16, wherein said security administration server manages a list of programs available to said security administration client, and prevents programs which are not included in said available program list from starting.

18. A total system for preventing information outflow according to claim 1, wherein a master boot record (MBR) of said computer storage device is encoded to control access by the at least one user computer with said security administration client wherein an encoding key value includes a hardware serial number of said at least one user computer.

19. A total system for preventing information outflow according to claim 18, wherein said hardware serial number is stored and managed by said security administration server.

20. A total system for preventing information outflow according to claim 1, wherein said security administration server shares said decoding key with each file security control unit of the security administration clients in a preset security group to allow said encoded file stored in said storage device to be decoded and read within said security group.

21. A total system for preventing information outflow according to claim 1, wherein said security administration client is installed in a plurality of user computers, wherein authorization from said security administration server is required to uninstall said security administration client from any one of said plurality of user computers.

22. A total system for preventing information outflow according to claim 1, wherein said file security control unit controls whether to operate said storage device in accordance with a request from said security administration server.

23. A total system for preventing information outflow according to claim 1, wherein said file security control unit receives and transfers the human-readable transfer description to said security administration server when storing said file in said storage device through said program.

24. A total system for preventing information outflow according to claim 1, wherein said administration client further comprises a temporary log information storage unit for storing said log information upon an interruption of communications with said security administration server, and transfers said stored log information to said security administration server when communication with said security administration server is recovered.

25. A total system for preventing information outflow from inside, comprising:
a program installed in a computer system for storing a file in a first storage unit connected to the computer system;

a security administration client including a file security control unit for encoding content of the file and storing a decoding key for the encoded file when storing the file in the first storage unit according to a request from the program; and a security administration server for receiving and storing the decoding key through communications with the file security unit, wherein, when the program requests the encoded file stored in the first storage unit, the file security control unit decodes the encoded file using the decoding key and transfers the decoded file to the program;

wherein the decoded file is stored in a second storage unit; and wherein the content of the file and log information are transferred to the security administration server upon receiving a human-readable transfer description, the transfer description describing the purpose of the transfer to the second storage unit.

26. The total system according to claim 25, wherein the first storage unit includes a hard disk, and the second storage unit includes a portable storage unit.

27. The total system according to claim 25, wherein each of the first and second storage units are different portable storage units.

28. A total system for preventing information outflow from inside, comprising:

a program installed in each of a plurality of user computers for storing a file in a storage unit connected to at least one of the plurality of user computers;

a security administration client including a file security control unit for encoding content of the file when storing the file in the storage unit according to a request from the program and providing a decoding key for the encoding file; and a security administration server receiving and storing the decoding key through communications with the file security control unit, wherein, when the program requests the encoded file stored in the storage unit, the file security control unit decodes the encoded file using the decoding key and transfers the decoded file to the program;

wherein each of the plurality of user computers is grouped into one or more preset security groups; and wherein the security administration server allows the security administration client to share the decoding key with one or more of the plurality of user computers in the same security group as one of the plurality of user computers storing the file.

29. The total system according to claim 28, wherein the security administration client is installed and operated in each of the plurality of user computers, and authentication from the security administration server is required to remove the security administration client from anyone of the plurality of user computers.

30. A total system for preventing information outflow from inside, comprising:

an application program for creating print data and transferring the print data to a print device;

a print control unit controlling print functions of the application program by intercepting the generated print data;

a security administration server receiving and storing the print data intercepted by the print control unit; and wherein the print data stored in the security administration server is outputted according to a request from an administrator.

* * * * *